United States Patent [19]

Cummings et al.

[11] Patent Number: 5,455,321

[45] Date of Patent: Oct. 3, 1995

[54] PROCESS FOR PRODUCING HIGH MOLECULAR WEIGHT MONOVINYLIDENE AROMATIC POLYMERS

[75] Inventors: Clark J. Cummings; Paul E. Hathaway, both of Midland, Mich.

[73] Assignee: The Dow Chemical Company, Midland, Mich.

[21] Appl. No.: 327,527

[22] Filed: Oct. 21, 1994

Related U.S. Application Data

[63] Continuation-in-part of Ser. No. 161,644, Dec. 2, 1993, abandoned.

[51] Int. Cl.[6] .................. C08F 4/36; C08F 4/38; C08F 4/34
[52] U.S. Cl. ............ 526/232.3; 526/82; 526/85; 526/227; 526/228; 526/232; 526/317.1; 526/328.5; 526/342; 526/347; 526/224
[58] Field of Search .................. 526/232.3, 224, 526/347, 85

[56] References Cited

U.S. PATENT DOCUMENTS

| | | | |
|---|---|---|---|
| 4,376,847 | 3/1983 | Matsubara et al. | 525/262 |
| 4,626,554 | 12/1986 | DiGiulio | 521/57 |
| 4,980,381 | 12/1990 | Hintz | 521/56 |
| 5,059,667 | 10/1991 | Nakamura | 526/324 |
| 5,179,166 | 1/1993 | Demirörs | 525/193 |
| 5,191,040 | 3/1993 | Okumura et al. | 526/65 |

*Primary Examiner*—Fred Zitomer

[57] ABSTRACT

A process for producing a monovinylidene aromatic polymer having molecular weight (Mw) greater than 275,000 which comprises polymerizing a monomer mixture comprising a monovinylidene aromatic monomer in the presence of:

A) from 10 to 2000 ppm by weight of at least one free radical generating, branching polymerization initiator; and B) from 10 to 2000 ppm of one or more organic gel reduction agent selected from the group consisting of:
  1) mercaptans, terpenes, halocarbons and halohydrocarbons, such agent having up to 20 carbons,
  2) distillate recovered from the reaction devolatilization process (recycle), and
  3) mixtures of 1) and 2).

9 Claims, No Drawings

PROCESS FOR PRODUCING HIGH MOLECULAR WEIGHT MONOVINYLIDENE AROMATIC POLYMERS

This is a continuation-in-part of application Ser. No. 08/161,644 filed Dec. 2, 1993, now abandoned.

The present invention relates to a process for producing a monovinylidene aromatic polymer and more particularly, to a process for producing high molecular weight polymers in a continuous manner without substantial formation of gels.

Various types of high-molecular weight monovinylidene aromatic polymers have been produced recently using branching initiators to give relatively high molecular weight polymers. For example, U.S. Pat. No. 5,191,040 discloses the use of tetrafunctional peroxyketal initiators in order to provide increased molecular weight polymers. In U.S. Pat. No. 4,376,847 ethylenically unsaturated peroxy functional initiators that are derivatives of maleic acid are disclosed for use in polymerization of styrene and other monovinylidene aromatic monomers.

While the use of branching initiators can result in the formation of improved molecular weight polymers, it has now been discovered that use of such initiators can also lead to increased formation of gels which are believed to be crosslinked polymer matrices that are undesired for several reasons. Gels can cause appearance defects and also lowered strength properties in molded articles made from polymers containing such gels. Continued accumulation of gels during a continuous polymerization process can also lead to reactor fouling, reducing the heat transfer capability of the reactor and ultimately necessitating discontinuation of the polymerization to clean the reactor of accumulations. Gels seem particularly prone to formation in the initial stages of polymerization under conditions of low monomer conversion with the previously mentioned branching initiators.

Thus, those skilled in the art have been seeking a method for producing monovinylidene aromatic polymers with a high molecular weight, branched structure which have reduced gels, especially such a method involving a continuous polymerization process. The present inventors have made intensive studies in order to develop a process for producing such polymers from the above-mentioned viewpoint.

According to the present invention there is provided a process for producing a monovinylidene aromatic polymer having molecular weight (Mw) greater than 275,000 which comprises polymerizing a monomer mixture comprising a monovinylidene aromatic monomer in the presence of:

A) from 10 to 2000 ppm by weight of at least one free radical generating, branching polymerization initiator; and B) from 10 to 2000 ppm of one or more organic gel reduction agent selected from the group consisting of:

1) mercaptans, terpenes, halocarbons and halohydrocarbons, such agent having up to 20 carbons, 2) distillate recovered from the reaction devolatilization process (recycle), and 3) mixtures of 1) and 2).

Generally, chain transfer agents are employed in addition polymerizations to limit the formation of higher molecular weight polymer products. Thus, it is not generally viable to employ such chain transfer agents in processes when the desired product must have high molecular weight. The present invention lies in the use of compounds that also act as chain transfer agents in order to reduce gel formation by using such agents in quantities less than the amount required to substantially reduce the molecular weight of the desired polymer product. Also, it has been discovered that gel formation is especially serious in the initial stages of multiple reactor processes. Thus, according to the present invention, the gel reduction agent is advantageously present in the initial stages of the polymerization. Also, most advantageously, the gel reduction agent and branching initiator are added simultaneously or concurrently to the reaction mixture for most efficient operation.

A continuous polymerization process normally employs one or more reactors operating in a plug-flow or in a back-mixed manner such that reaction productions from one reactor are allowed to flow to subsequent reactors in a series of reactors with or without the further addition of initiator, chain transfer agent, recycle or more monomer. Each reactor in the series is continuously charged with reaction mixture emanating from the preceding reactor in the series while reaction products are continuously discharged to a subsequent reactor of the series or finally to a polymer separation device, especially a devolatilizer. Plug flow implies that substantially no mixing of the reaction mixture between separate regions of the reactor occurs. An example of a plug-flow reactor is known as a stirred tube reactor. Conversely, a back mixed reactor attains thorough mixing of the reactor contents. An example of a back mixed reactor is a continuous stirred tank reactor or CSTR. Either plug flow or back-mixed reactors or a combination thereof may be employed in the practice of the present invention.

Monovinylidene aromatic monomers used in the present invention include styrene; nuclear substituted monovinylidene aromatic monomers such as p-methylstyrene, p-t-butylstyrene, m-methylstyrene and 2,5-dimethylstyrene; nuclear substituted-halogenated monovinylidene aromatic monomers such as p-chlorostyrene, p-bromostyrene and dibromostyrene; or a mixture of the foregoing monomers.

According to the present invention, the above-mentioned monovinylidene aromatic monomers can be used alone or in combination with up to 50 weight percent of one or more comonomers which are copolymerizable therewith. Examples of these comonomers include acrylonitrile, methyl methacrylate, acrylic acid, methyl acrylate, n-butyl acrylate, t-butyl acrylate, maleic anhydride, and N-phenylmaleimide.

The reaction mixture of the present invention may also contain one or more dissolved rubbery polymers having Tg less than 25° C., preferably less than 0° C., to produce impact modified homopolymer or copolymer products via the well known graft polymerization technique. Suitable rubbers include block copolymer or random copolymer rubbers, especially styrene/butadiene copolymers, such as triblock copolymers and homopolymers, especially polybutadiene. Grafted emulsion rubbers having monomodal or multimodal rubber particle sizes are also suitably employed, Therefore, monovinylidene aromatic polymers formed according to the present invention include not only homopolymers and copolymers of monovinylidene aromatic monomers but also impact modified varieties of such homopolymers and copolymers. A preferred monovinylidene aromatic monomer is styrene. A preferred polymer is nonimpact modified homopolystyrene, also referred to as general purpose polystyrene.

Polymer molecular weights herein are determined by the technique of gel permeation chromatography (GPC). Preferred polymers according to the present invention have a weight average molecular weight from 275,000 to 500,000, more preferably from 280,000 to 350,000, and a ratio of weight average molecular weight to number average molecular weight (Mw/Mn) from 1.0 to 3.5, preferably from 2.0 to 3.0. At lower molecular weights the polymer lacks adequate strength. Preferred polymers have a tensile strength of at least 6,000 psi (41 MPa). At higher molecular weights the polymer becomes difficult to process because of the low melt flow rate. Preferred polymers possess a melt flow rate (ASTM 1238, Condition G) of at least 1.0 dg/min. The gel content of the polymer is preferably less than 1×$10^{-2}$ g/kg polymer, more preferably less than 1×$10^{-3}$ g/kg polymer.

Free radical generating, branching polymerization initiators as used herein are of two classes. The first class (A1) includes compounds containing an average of more than 2 functionalities able to generate free radicals under polymerization conditions the remnant of which compound incorporates into the polymer thereby providing an average of more than 2 growing polymer chain segments. The second class (A2) includes compounds containing at least one functionality able to generate free radicals under polymerization conditions of the reaction and at least one ethylenic unsaturation able to be polymerized under the polymerization conditions of the reaction. Functionalities able to generate free radicals include, peroxide, hydroperoxide and azo functionalities.

Preferred free radical generating, branching polymerization initiators of class A1 are compounds selected from the group consisting of multifunctional organic peroxides or peroxyketals of the formula (I):

$$R'((CO)_nOOR)_m \qquad (I)$$

wherein

R' is a multifunctional organic radical of up to 25 non-hydrogen atoms,

R represents a $C_{4-15}$ tertiary alkyl group or a $C_{7-15}$ tertiary aralkyl group, n is 0 or 1, and m is an integer from 3 to 6.

Examples of suitable free radical generating, branching polymerization initiators of class A1 include:

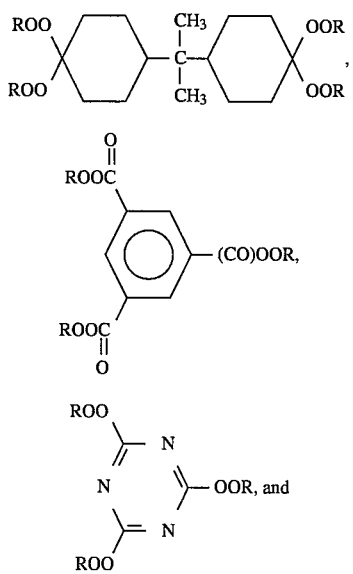

-continued

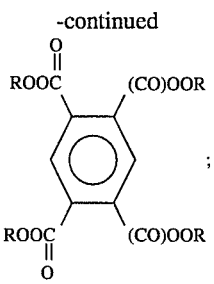

wherein R is as previously defined.

Examples of free radical generating, branching polymerization initiators of class A2 include compounds of the formula:

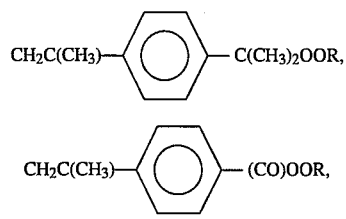

ROO—C(O)—CH═CH—C(O)OR, and

ROOC(O)—CH═CH—C(O)OOR;

wherein R is as previously defined.

The multifunctional organic peroxides or peroxyketal initiators A1) utilized herein especially include those wherein R is a tertiary butyl group, tertiary amyl group, tertiary octyl group, cumyl group, or 1-ethyl-1-phenylpropyl group. Preferably R is tertiary butyl. Specific examples of these initiators include: 2,2-bis(4,4-ditertiarybutylperoxycyclohexyl) -propane; 2,2-bis(4,4-ditertiaryamylperoxycyclohexyl) -propane; 2,2-bis(4,4-dicumylperoxycyclohexyl)propane; and 2,2-bis(4,4-ditertiarybutylperoxycyclohexyl)butane. A most highly preferred initiator is 2,2-bis(4,4 -ditertiarybutylperoxycyclohexyl)propane.

The initiators A2) utilized herein also especially include those wherein R is a tertiary butyl group, tertiary amyl group, tertiary octyl group, cumyl group, or 1-ethyl-1-phenylpropyl group. Most preferably R is tertiary butyl. Highly preferred initiators, A2, are peroxy and peroxyketal derivatives of maleic acid or fumaric acid. A most preferred initiator of the A2 group is t-butylperoxy-n-butylfumarate. A mixture of the foregoing initiators A1) and A2) may be used as well.

The amount of the free radical generating, branching initiator added to the reaction mixture is preferably from 50 to 1000 ppm by weight, most preferably from 100 to 500 ppm by weight based on total monomer content. When the amount of initiator is less than 10 ppm by weight, its presence is not substantially effective. When the amount is more than 2000 ppm by weight, the polymers obtained have too low molecular weight to be highly useful in molding applications.

The process of the present invention is carried out by the use of above-mentioned free radical generating, branching initiator and, if desired, conventional polymerization initiators. Suitable conventional polymerization initiators include monofunctional and difunctional organic peroxides such as tertiarybutylhydroperoxide, ditertiarybutylperoxide, cumene hydroperoxide, dicumylperoxide, benzoylperoxide, 1,1- bis(t-butylperoxy)cyclohexane, and 1,1-bis(tertbutylperoxy)-3,3,5-trimethylcyclohexane; and azo compounds such as azobisisobutyronitrile, azobis-2,4-dimethylvaleronitrile, azobiscyclohexanecarbonitrile, azobismethyl isolacetate, and azobiscyanovalerate.

The free radical generating, branching initiators are incorporated into the reaction system by a variety of means, the methods thereof are not otherwise limited. They may be fed either as a whole in the initial stage of the polymerization or in two or more divided lots in the initial and succeeding stages of the polymerization. Conventional peroxide initiators (when used) and free radical generating, branching initiators may be separately added to the reactor in any order or combined and added together with the branching initiator.

Preferred organic gel reduction agents used according to the present invention include $C_{5-20}$ aliphatic and aromatic mercaptans; especially n-dodecylmercaptan, and $C_{1-4}$ halogenated hydrocarbons; especially carbon tetrachloride. The organic gel reduction agent may be combined with the free radical generating, branching initiator and added to the reactor, combined with the monomer(s) and added to the reactor or separately added to the reaction mixture. Preferred quantities of gel reduction agent employed are from 10 to 1000 ppm based on monomer amount.

The present invention desirably employs the use of recycle liquids generated by devolatilization of the reactor effluent, generally from the latter stages of the reaction. Preferably, such recycle is added to the first reactor in a series of continuous reactors in order to obtain the benefit of reduced gel formation. In the preparation of general purpose polystyrene, the reactor recycle includes unreacted styrene monomer, solvent (generally ethyl benzene, xylene or toluene) impurities of the monomer manufacture (especially, n-propyl benzene, isopropyl benzene, 3-phenyl-1-propene, 2-phenyl-1-propene, 1-phenyl-1-propene, acetophenone, phenylacetaldehyde, styrene oxide, phenylacetylene, and 1-hydroxy-2-phenylethane) and by-products of the polymerization process (especially, styrene dimer and trimer, i.e., oligomers of 2 or 3 styrene units). Other unknown ingredients may also be present in the recycle that advantageously reduce the formation of gels in the resulting product.

In the practice of the invention, the recycle (the more volatile components of the reaction mixture separated from polymer and preferably further separated from less volatile reactor by-products (tars)) is recovered from one or more devolatilizers and added to the reaction mixture in the initial and optionally in subsequent reactors in the series. Additional mercaptan, terpene, halocarbon or halohydrocarbon organic, gel reduction agent may be added as well, especially to the initial reactor of the series, so long as the molecular weight of the resulting polymer is not reduced below the desired lower limit of 250,000. Generally, large quantities of recycle may be added to the reactor before detrimental effect on polymer molecular weight occurs. The amount of mercaptan, terpene, chlorocarbon or chlorohydrocarbon added must be more carefully controlled due to the greater chain transfer effect thereof.

The polymerization according to the present invention usually is the continuous bulk or solution polymerization, but batch polymerizations are included as well. The continuous, bulk or solution polymerization preferably utilized according to the present invention is carried out in the following manner. The monomers are fed into a system consisting of 1 or more units of mixing flow type reactors and/or plug flow type reactors which are connected in series and one or more units of monomer devolatilizing equipment. The reaction temperatures are preferably from 70° to 250° C. with the first reactors of the series generally operating at lower temperatures than the temperature in subsequent reactors. As described above, the desired amount of multifunctional organic peroxide is incorporated either as a whole in the initial stage or the polymerization or as divided lots in the initial and following stages of the polymerization. A solvent such as ethylbenzene, toluene or xylene may also be added to the reaction system. The reaction rate, r, is not otherwise limited and preferably is in a range of 5 to 50 percent/hour. The conversion of styrene monomer at the exit of the final reactor in the series is preferably from 40 to 90 percent by weight.

In a batch, bulk polymerization, a similar process as that of the above preferred, continuous, bulk polymerization is conducted, excepting that only one reactor is utilized and the entire reactor contents are devolatilized, usually after a degree of conversion of from 10 to 75 percent is reached.

Discharged polymerizate is then fed into monomer devolatilizing equipment to remove residual monomer(s) and solvents. The devolatilized polymer is then pelletized into the final product. Additives such as antioxidants, lubricating agents, mold release agents, flame retardants, fillers and colorants may be added to the polymer as it is pelletized. Examples of monomer devolatilizing equipment include a thin film type evaporator, falling strand evaporator, flat place heater, and flash drum devolatilizer. The equipment is operated, for example, at temperatures of 180° to 300° C. and pressures of 0.01 to 600 atmospheres (1–60,000 kPa). The final polymer product usually has a residual monomer content in an amount of not more than 5000 ppm by weight, preferably not more than 1000 ppm by weight and more preferably not more than 500 ppm by weight.

According to the present invention, high-molecular weight monovinylidene aromatic polymers can be obtained without substantial gel formation. The molded products made therefrom exhibit significantly improved aesthetic properties due to the reduction of gel formation in comparison with the products made using free radical, branching, initiators alone. The polymers prepared according to the present invention are used as molding materials to prepare various different household goods, electric appliances, consumer articles and packaging materials such as film and foam articles.

The present invention will now be described in greater detail by means of the following examples and comparative examples which are provided for illustrative purposes only. In the examples and comparative examples, percentages and ratios are based on weight.

EXAMPLE 1

Styrene was polymerized in a continuous tubular laboratory reactor operating at low conversion to simulate the initial reactor in a multi-reactor sequence. The reaction temperature was maintained at 100° C. No solvent was present, Average reactor residence time was 2 minutes. Different initiators were tested with and without the presence of a n-dodecylmercaptan (NDM) chain transfer agent. The quantity of gels in the resulting polymer were measured by dissolving the polymer in toluene, filtering and weighing the insoluble gels. Results are contained in Table I.

TABLE I

| Run | Initiator (ppm) | ppm NDM | gel (mg) | Polymer Mw |
|---|---|---|---|---|
| 1 | BDPP[1] (200)[2] | 50 | 1.2 | 333,000 |
| Comp. A | BDPP[1] (428)[3] | 0 | 14.3 | 693,000 |
| Comp. B | " | 100 | 6.7 | 209,000 |
| Comp. C | BPBF[4] (750) | 0 | >5000 | >1,000,000 |
| Comp. D | " | 100 | 1.2 | 157,000 |

[1]2,2-bis(4,4-detertiarybutylperoxycyclohexyl) propane
[2]includes 5 weight percent ethylbenzene
[3]no ethylbenzene
[4]t-butylperoxy-n-butylfumarate As may be seen by reference to Table I, the presence of the organic, gel reduction agent in addition to the free radical generating, branching initiator greatly reduced gel formation in the resulting polymer. By controlling the amounts of such gel reduction agent and initiator used it is possible to attain the dual objective of molecular weight greater than 275,000 and low gel formation as illustrated by Run 1 versus comparative A and B. Comparative examples C and D illustrate the ability of the gel reduction agent to reduce gel formation using a fumarate initiator. The quantity of gel reduction agent used was not optimized in order to attain the desired polymer molecular weight.

EXAMPLE 2

A miniature continuous reactor was used to polymerize polystyrene over a 21 day period. The polystyrene formed had a weight average molecular weight (Mw) of 340,000. During the test, reactor conditions were altered to produce a constant Mw product. The solvent was ethylbenzene. The initiator, 2,2-bis(4,4-ditertiarybutylperoxycyclohexyl)propane was added to the initial reactor to provide an initiator level of 428 ppm. Results are contained in Table II.

TABLE II

| Run | n-dodecylmercaptan (ppm) | Gel (g) | Solvent (%) |
|---|---|---|---|
| 3 | 100 | 0.5[1] | 2.0 |
| Comp. C | 0 | 12[2] | 8.25 |

[1]Total gel formed after 21 days equals $0.9 \times 10^{-3}$ g/kg polymer
[2]Total gel formed after 21 days equals $2.3 \times 10^{-2}$ g/kg polymer

What is claimed is:

1. A process for producing a monovinylidene aromatic polymer having molecular weight (Mw) greater than 275,000 which comprises polymerizing a monomer mixture comprising a monovinylidene aromatic monomer in the presence of:

A) from 10 to 2000 ppm by weight of at least one free radical generating, branching polymerization initiator; and B) from 10 to 2000 ppm of one or more organic gel reduction agents selected from the group consisting of:
 1) mercaptans, terpenes, halocarbons and halohydrocarbons, such agent having up to 20 carbons,
 2) a recycle liquid generated by devolatilization of the polymerized monomer mixture, and
 3) mixtures of 1) and 2), wherein said initiator and gel reduction agent are present in initial stages of polymerization.

2. A process according to claim 1 wherein the free radical generating, branching, polymerization initiator is of the formula $$R'((CO)_n OOR)_m$$

wherein

R' is a multifunctional organic radical of up to 25 non-hydrogen atoms,

R represents a $C_{1-15}$ tertiary alkyl group or a $C_{7-15}$ tertiary aralkyl group, n is 0 or 1, and m is an integer from 3 to 6.

3. A process according to claim 1 wherein the monovinylidene aromatic monomer is styrene.

4. A process according to claim 1 wherein the initiator is selected from the group consisting of 2,2-bis (4,4-ditertiarybutylperoxycyclohexyl )propane and t-butylperoxy-n-butylfumarate.

5. A process according to claim 1 wherein the organic, gel reduction agent is n-dodecylmercaptan.

6. A process according to claim 1 wherein the quantity of gels in the polymer product is less than $1 \times 10^{-2}$ g/kg polymer.

7. A continuous process according to claim 1 wherein liquid components obtained upon devolatilization of the reaction mixture are added to the initial polymerization mixture.

8. A continuous process according to claim 7 which is conducted in multiple reactors connected in series and wherein at least some of the the liquid components obtained upon devolatilization of the reaction mixture are added to the initial reactor of the multiple reactor series.

9. A process according to claim 1 wherein the monovinylidene aromatic monomer is selected from styrene, p-methylstyrene, p-t-butylstyrene, m-methylstyrene, 2,5-dimethylstyrene, p-chlorostyrene, p-bromostyrene, dibromostyrene, a mixture thereof, or a mixture of said monovinylidene aromatic monomer with up to 50 weight percent of one or more comonomers selected from acrylonitrile, methyl methacrylate, acrylic acid, methyl acrylate, n-butyl acrylate, t-butyl acrylate, maleic anhydride, or N-phenylmaleimide; said monomer mixture optionally containing one or more dissolved rubbery polymers having Tg less than 25° C.

* * * * *